(12) United States Patent
Farhangi et al.

(10) Patent No.: US 10,135,916 B1
(45) Date of Patent: Nov. 20, 2018

(54) INTEGRATION OF SERVICE SCALING AND EXTERNAL HEALTH CHECKING SYSTEMS

(71) Applicant: Amazon Technologies, Inc., Seattle, WA (US)

(72) Inventors: Alireza Farhangi, Vancouver (CA); Christopher Barclay, Seattle, WA (US); Sairam Suresh, North Vancouver (CA); Pierre Rognant, Toulouse (FR); Sean Henry Lewis Meckley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 15/269,829

(22) Filed: Sep. 19, 2016

(51) Int. Cl.
| G06F 15/173 | (2006.01) |
| H04L 29/08 | (2006.01) |
| H04L 12/26 | (2006.01) |
| H04L 29/12 | (2006.01) |

(52) U.S. Cl.
CPC .......... H04L 67/1002 (2013.01); H04L 43/08 (2013.01); H04L 61/1511 (2013.01); H04L 67/14 (2013.01)

(58) Field of Classification Search
CPC ... H04L 67/1002; H04L 43/08; H04L 61/1511
See application file for complete search history.

(56) References Cited

U.S. PATENT DOCUMENTS

| 6,338,082 | B1 | 1/2002 | Schneider |
| 7,254,626 | B1 | 8/2007 | Kommula et al. |
| 7,657,629 | B1 | 2/2010 | Kommula |
| 8,972,604 | B1 | 3/2015 | Ramsden-Pogue et al. |
| 9,154,551 | B1 | 10/2015 | Watson |
| 9,363,282 | B1 | 6/2016 | Yu et al. |
| 9,705,817 | B2 | 7/2017 | Lui |
| 2005/0066032 | A1 | 3/2005 | Birkestrand et al. |
| 2006/0259625 | A1 | 11/2006 | Landfeldt et al. |
| 2007/0160033 | A1 | 7/2007 | Bozinovski et al. |
| 2010/0010991 | A1 | 1/2010 | Joshi |
| 2010/0121932 | A1 | 5/2010 | Joshi et al. |
| 2010/0223378 | A1 | 9/2010 | Wei |
| 2010/0228819 | A1 | 9/2010 | Wei |
| 2010/0250748 | A1 | 9/2010 | Sivasubramanian et al. |
| 2010/0313063 | A1 | 12/2010 | Venkataraja et al. |
| 2011/0010463 | A1 | 1/2011 | Christenson et al. |
| 2011/0083138 | A1 | 4/2011 | Sivasubramanian et al. |
| 2011/0307541 | A1 | 12/2011 | Walsh et al. |
| 2013/0198269 | A1 | 8/2013 | Fleischman et al. |
| 2014/0195687 | A1 | 7/2014 | Rewaskar et al. |

(Continued)

*Primary Examiner* — Ranodhi Serrao
(74) *Attorney, Agent, or Firm* — Knobbe, Martens, Olson & Bear, LLP

(57) ABSTRACT

Systems and methods are described to enable integrating operation of a service record system with operation of a hosting system. The service hosting system can maintain a set of servers to provide a network-accessible service, and the service record system can maintain records identifying the set of servers as endpoints for the service. The service record system can periodically transmit health check data to servers within the set, to verify their health status. When the service record system determines that a server is unhealthy, it can notify the hosting system. If the hosting system removes the server from the pool, it can notify the service record system, so that the service record system can halt further health checking of the server.

19 Claims, 6 Drawing Sheets

(56) References Cited

U.S. PATENT DOCUMENTS

| | | |
|---|---|---|
| 2014/0304414 A1 | 10/2014 | Yengalasetti et al. |
| 2014/0337472 A1 | 11/2014 | Newton et al. |
| 2015/0067135 A1 | 3/2015 | Wang et al. |
| 2015/0281111 A1 | 10/2015 | Carl |
| 2016/0182614 A1 | 6/2016 | Udupi et al. |
| 2016/0323187 A1 | 11/2016 | Guzman et al. |
| 2016/0323197 A1 | 11/2016 | Guzman et al. |
| 2016/0337311 A1 | 11/2016 | Le Rouzic et al. |
| 2016/0352588 A1 | 12/2016 | Subbarayan et al. |
| 2017/0063627 A1 | 3/2017 | Viswanathan et al. |
| 2017/0223100 A1 | 8/2017 | Wu et al. |
| 2017/0302521 A1 | 10/2017 | Lui et al. |

INTEGRATION OF SERVICE SCALING AND EXTERNAL HEALTH CHECKING SYSTEMS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some instances, multiple computing devices (e.g., virtual computing devices) can work in concert to provide a network-accessible service, such as a web site. The number of computing devices providing the service may be varied based on a demand for the service. For example, a highly demanded service can be implemented by a greater number of computing devices, and a less demanded service can be implemented by fewer computing devices. In some instances, the number of computing devices used to implement a service can be varied automatically or programmatically in response to demand. Illustratively, as demand for a service rises, additional computing can be used to implement the service, and as demand falls, computing devices can be decommissioned from the service.

Because the number of computing devices implementing a service may vary, technologies exist to enable client devices to discovery those computing devices. One example of such a technology is the domain name system (DNS), which enables client devices to retrieve, from DNS servers, network addresses for computing devices corresponding to an identifier (e.g., a domain name or a universal resource indicator, or URI). Illustratively, for a web service corresponding to a domain name, client devices may utilize DNS services to determine network addresses for computing devices implementing that web service.

DETAILED DESCRIPTION

Figure 1:
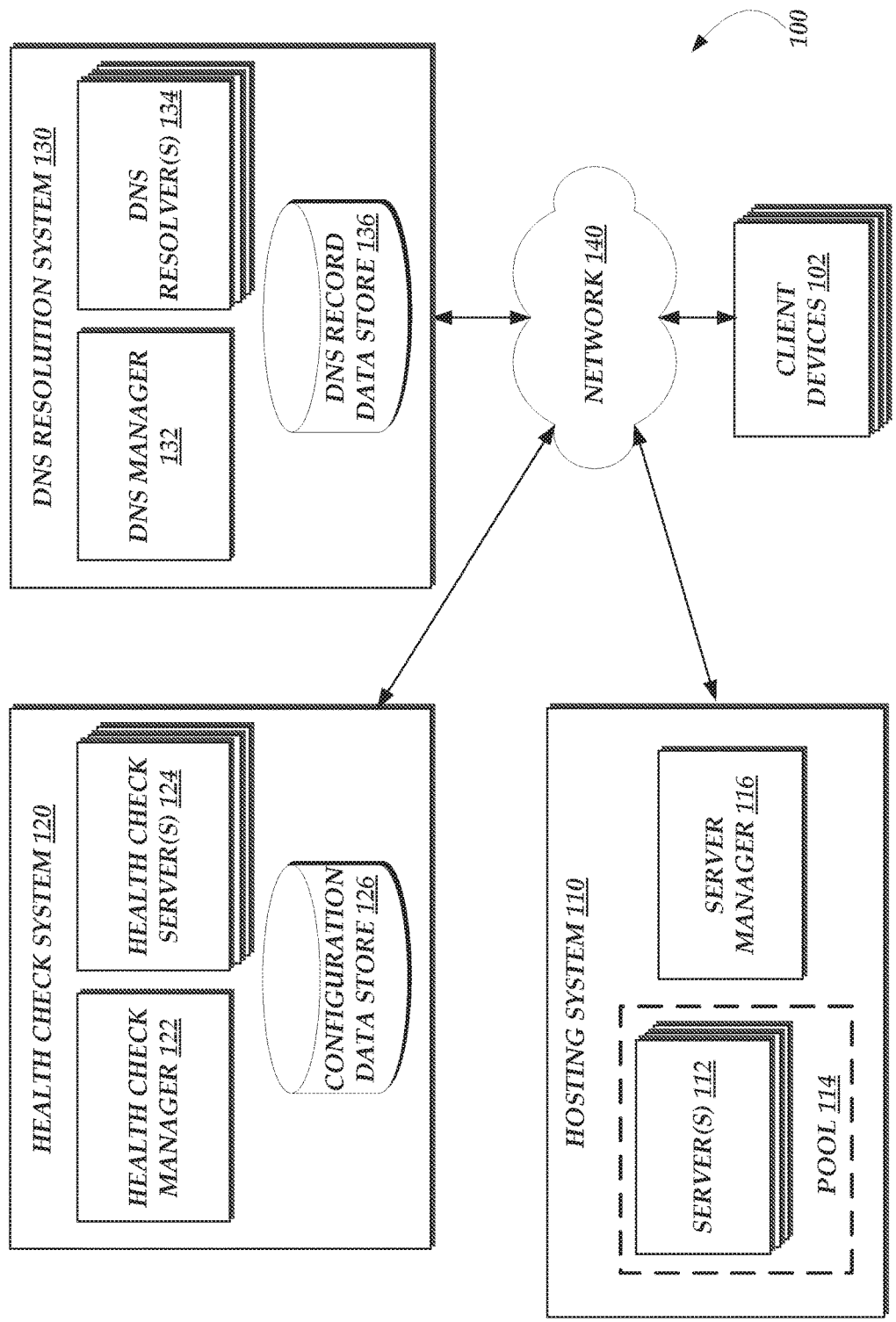
FIG. 1 is a block diagram of an illustrative network environment including a hosting system including a pool of servers hosting a web service, a DNS resolution system enabling discovery of the pool of servers, and a health check system monitoring the health of the pool of servers.

Generally described, the present disclosure relates to managing discovery of a network-accessible service based on the state of a pool of servers implementing that service. More specifically, the present disclosure relates to integrating operation of a service discovery system, such as a domain name system (DNS), with operation of an automatic scaling system, to increase the performance and efficiency of both systems. Automatic scaling systems generally function to increase or decrease the number of computing devices, such as virtual computing devices, that collectively implement a network-accessible service. Service discovery systems generally function to enable client devices to discover access information, such as network addresses, for computing devices implementing such a network-accessible service. However, automatic scaling systems and service discovery systems often operate independently, such that the service discovery system is unaware of when an automatic scaling system alters the number or configuration of computing devices implementing a service. This can lead to inefficiencies or errors for the service. For example, where an automatic scaling system reduces the number of computing devices implementing a service by shutting down a computing device, the service discovery system may continue to advertise that now-halted computing device as providing the service. This results in errors for client devices that attempt to access the service at the halted computing device. Aspects of the present disclosure address this case, by enabling an automatic scaling system to work in concert with a service discovery system to scale down services without causing errors. Further, aspects of the present disclosure enable information obtained at the service discovery system to be communicated to the network scaling system, to control operation of that system. For example, health check information used to control a service discovery system may also be communicated to the automatic scaling system, such that unhealthy servers implementing a service can be halted and replaced with healthy services, while appropriately controlling service discovery records during that replacement.

As an illustrative example, consider a hosting system that provides a set of virtual computing devices implementing a web site. The hosting system may implement automatic scaling and load balancing for the web site, such that if the computing resource load on any given virtual computing devices exceeds a threshold level, the hosting system generates a new virtual computing device implementing the web site. One or more DNS servers can enable client devices to discover the virtual computing devices implementing the web site. However, the DNS servers may not generally be aware of the operation of the hosting system. Thus, to ensure the virtual computing devices are accessible to client devices, each virtual computing device may be required to advertise their implementation of the web site to the DNS servers. While such advertisement is possible, it increases the complexity of operation of the virtual computing devices and results in a delay before the virtual computing device is known at the DNS servers to be providing the web site.

To address this inefficiency, embodiments of the present disclosure provide a service discovery system, such as a DNS, enabled to monitor a state of computing devices implementing a service, and to modify records for the service accordingly. Illustratively, a set of DNS servers may be configured to receive from an automatic scaling system notifications of when new virtual computing devices are created to provide a web site, and to automatically add network addresses of those virtual computing devices to DNS records for the web site, such that the virtual computing device itself need not advertise the service to the DNS servers. Such automatic modification of service discovery records enables closer integration of service discovery systems and automatic scaling systems, reduces the complexity of the virtual computing devices (e.g., by reducing or eliminating the need for service advertisement), and increases the efficiency of the web site overall (by reducing the delay in enabling new virtual computing devices to serve content of the web site).

The present disclosure further enables service discovery systems to maintain awareness of and implement appropriate responses to scale-downs in an automatic scaling system (e.g., removal of computing devices from a set providing a service). In existing service discovery mechanisms, scale downs often result in errors, because the service discovery system advertises a computing device as an endpoint for a service even after that computing device ceases to provide the service (or, indeed, to exist). While some service discovery mechanisms implement health checking protocols or other error-mitigation protocols to discover these false advertisements and remove the corresponding server from their records, these protocols nevertheless result in the potential for errors at client computing devices until the no-longer-available server is discovered and removed from service discovery records.

To address these instances, a service discovery system is described herein that can detect scale-down events at an automatic scaling system, and halt or delay such scale-down events until no records for the to-be-removed server are expected to be relied on by client devices. Illustratively, a service discovery system can respond to a scale-down event by ceasing to advertise the to-be-removed server to client devices (or other components of the service discovery system). The service discovery system may then wait for a period of time during which prior records for the to-be-removed server are considered "live." Illustratively, prior records may be considered live for a period of time equal to a time at which a last service discovery record for the to-be-removed server was transmitted, plus a "time-to-live" value for the record. For example, assume that a service discovery system transmits to a client device a record indicating that a server is hosting a web site, and that the service discovery system simultaneously detects that the server is to be removed as providing the web site. In such an instance, the service discovery system may cease providing new records indicating that the server is hosting the web site, and may further prevent the server from being removed as providing the website for a time equal to the time-to-live (TTL) value of the record (e.g., one minute). Because TTL values indicate how long a record should be considered "valid," after an amount of time equal to the TTL value has passed, the service discovery system may assume that no client would seek to access the web site from the server, and may therefore instruct an automatic scaling system to remove the server as providing the web site. In this way, sets of computing devices providing a service may be scaled down, without resulting in errors as client device seek to access scaled-down computing devices.

As noted above, service discovery systems sometimes implement error-mitigation protocols, which enable the service discovery systems to detect unresponsive or unhealthy computing devices associated with a service, and to halt advertisement of these computing devices in connection with the service. In accordance with embodiments of the present disclosure, these error mitigation protocols can additionally or alternatively be used to assist in operation of automatic scaling for the service. Illustratively, assume that a service discovery system detects that a server providing a service has become unresponsive. While the service discovery system may halt advertising the server immediately, it may be undesirable to completely disregard the server, given that it may become response again in the future. Thus, the service discovery system may continue to check on the health of the server for at least a period of time. No matter how this period is set, such a configuration introduces inefficiencies. For example, if an unhealthy server has been removed from providing a service, a health check would be expected to fail continuously in the future, and thus, any transmitted health checks represent an unnecessary drain on computing resources. Conversely, if an unhealthy server becomes healthy again after health checks cease, the service discovery system may be unaware of the server (e.g., until that server once again advertises that it is available to provide a service). Embodiments of the present disclosure provide an improved protocol for mitigating unhealthy servers, by enabling a service discovery system to communicate with an automatic scaling system, to verify whether an unhealthy server is expected to become healthy in the future. If the server is not expected to become healthy, the automatic scaling system can take mitigating action, such as rebooting or recreating the server. Moreover, the service discovery system can halt transmitting health checks to the server. On the other hand, if the server is expected to once again become healthy (e.g., if the unhealthy state is the result of maintenance at the automatic scaling system or some other temporary issue), the automatic scaling system can continue to transmit health checks to the server to verify the server's health (e.g., until the server becomes healthy and normal operation resumes, or until the automatic scaling system informs the service discovery system that the server is to be removed).

As will be appreciated by one of skill in the art in light of the present disclosure, the embodiments disclosed herein improves the functionality of computing systems implementing service discovery systems and automatic scaling systems for network-accessible services. Specifically, the embodiments disclosed herein provide for service discovery systems to adapt service records based on knowledge of how an automatic scaling system scales up or scales down computing devices hosting a service, resulting in a reduction of errors and an increase in accuracy of service discovery records. Moreover, embodiments of the present disclosure enable health checking services that are implemented by or on behalf of a service discovery system to also effect operation of an automatic scaling system for a service, increasing the efficiency of that automatic scaling system. Still further, embodiments of the present disclosure enable communications between service discovery systems and automatic scaling systems, to enable service discovery systems to transmit health checks to servers only when appropriate. The presently disclosed embodiments therefore address technical problems inherent within computing systems; specifically, the difficulty in maintaining accurate discovery records for dynamic, automatically scaled services. These technical problems are addressed by the various technical solutions described herein, including communications protocols for integrating operation of service discovery systems and automatic scaling systems. Thus, the present disclosure represents an improvement on existing virtual network systems and computing systems in general.

With reference to FIG. 1, a block diagram showing a simplified logical environment 100 will be described in which client devices 102, a hosting system 110, a health check system 120, and a DNS resolution system 130 may interact via a network 140.

Network 140 may be any wired network, wireless network, or combination thereof. In some instances, network 140 may be a telecommunications network, such as a personal area network, local area network, wide area network, cable network, satellite network, cellular telephone network, or combination thereof operating via the internet protocol (IP). In other instances, the network 140 may be or may include other network types, such as television networks or radio networks. In the example environment of FIG. 1, network 140 is a global area network (GAN), such as the Internet. Protocols and components for communicating via the other aforementioned types of networks are well known to those skilled in the art of electronic communications and thus, need not be described in more detail herein. While each of the client devices 102, hosting system 110, health check system 120, and DNS resolution system 130 is depicted as having a single connection to the network 104, individual elements of the client devices 102, hosting system 110, health check system 120, and DNS resolution system 130 may be connected to the network 140 at disparate points. Accordingly, communication times and capabilities may vary between the components of FIG. 1. While shown in FIG. 1 as a single network, the network 140 may represent different networks interconnecting the different components of FIG. 1. For example, the network 140 may represent a first network (e.g., the Internet) that interconnects the client devices 102 to the a second, private network (not shown in FIG. 1) shared between the hosting system 110, health check system 120, and DNS resolution system 130.

Client devices 102 may include any number of different devices configured to interact with the hosting system 110 or other elements of FIG. 1, to access network-accessible services provided by FIG. 1, and to configure operation of the hosting system 110, health check system 120, and DNS resolution system 130. For example, individual client devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. Each client devices 102 may include hardware and/or software enabling communication via the network 140.

The hosting system 110 includes a plurality of servers 112 logically arranged within a pool 114 and providing a network-accessible service, such as a web site or database (among many other possible network-accessible services, myriad examples of which are known in the art). Illustratively, each of the servers 112 may correspond to a virtual machine instance implemented by an underlying physical host computing device (not shown in FIG. 1) and configured with an operating system and software to implement a network-accessible service. In other instances, one or more servers 112 may correspond to a physical computing device. Each server may be accessible over the network 140 via a network address, such as an Internet Protocol (IP) address. In one embodiment, each server 112 maintains a distinct network address. In another environment, one or more servers 112 share a network address (e.g., via any cast routing mechanisms). While not shown in FIG. 1, the hosting system 110 may include additional components enabling the servers 112 of the pool 114 to collectively provide access to a service, such as load balancing components, network routing components, etc. Such components are known in the art, and therefore will not be described in detail herein.

The hosting system 110 further includes a server manager 116 configured to control operation of the servers 112. The server manager 116 may, for example, be configured to generate servers 112 (e.g., as virtual machine instances) or otherwise load computing devices with the requisite software or configurations needed to operate as part of the pool 114. The server manager 116 may further be configured to monitor the health or resource usage of servers 112 within the pool, such as by monitoring computing resources used by the servers 112, monitoring for critical failures of the servers 112, etc. In accordance with embodiments of the present disclosure, the server manager 116 may operate to automatically scale the number or configuration of the servers 112 in the pool 114 based, for example, on computing resources used by the servers 112 of the pool 114. Illustratively, where the average computing resources usage of the servers 112 in the pool 114 exceeds a threshold amount, the server manager 116 may add new servers 112 to the pool to reduce this computing resource usage. Computing resources may include, for example, central processing unit (CPU) usage, memory usage (e.g., random access memory, or RAM), network bandwidth usage, or other computing resources. Further, where the average computing resources usage of the servers 112 in the pool 114 falls under a threshold amount, the server manager 116 may remove servers 112 from the pool to maintain a desired computing resource (and to prevent the need to maintain resources for underutilized servers 112). The addition or reduction of the number of servers 112 in the pool 114 is generally referred to herein as automatic scaling of the pool 114.

As noted above, the various servers 112 within the pool 114 are associated with network addresses, through which the service of the pool 114 can be accessed (e.g., by client devices 102). In many instances, it is undesirable to require a client device 102 to maintain knowledge of the network addresses of the servers 112. Thus, the environment 110 further includes a DNS resolution system 130 that aids in discovery of network addresses based on other identifiers, such as domain names or URIs. The DNS resolution system 130 may implement functions common to traditional DNS, which is known in the art. For example, the DNS resolution system 130 can include a DNS record data store 136 that maintains records mapping domain names or other identifiers to corresponding network addresses. The DNS resolution system 130 can further include DNS resolvers 134 configured to receive requests (e.g., from client devices 102) for DNS records corresponding to an identifier (e.g., domain name, URI, etc.) and return relevant records to a requesting device. In this manner, the DNS resolvers can enable client devices 102 to discover network addresses or other DNS information corresponding to an identifier. For example, where servers 112 within the pool 114 are configured to host a web site associated with the domain name "www.example.tld," the DNS resolvers 134 may obtain DNS requests corresponding to that domain name, and return a set of network addresses associated with the servers 112. In one embodiment, DNS resolvers 134 may return DNS records including network addresses of each server 112 within the pool 114. In another embodiment, DNS resolvers 134 may return DNS records including network addresses of only one or more selected servers 112 within the pool 114. Such servers 112 may be selected, for example, according to load distribution or balancing techniques (e.g., round robin, random selection, load-based selection, etc.). The DNS resolution system 130 further includes a DNS manager 132 to manage operation of the DNS resolvers 134, as described in more detail below.

Figure 2:
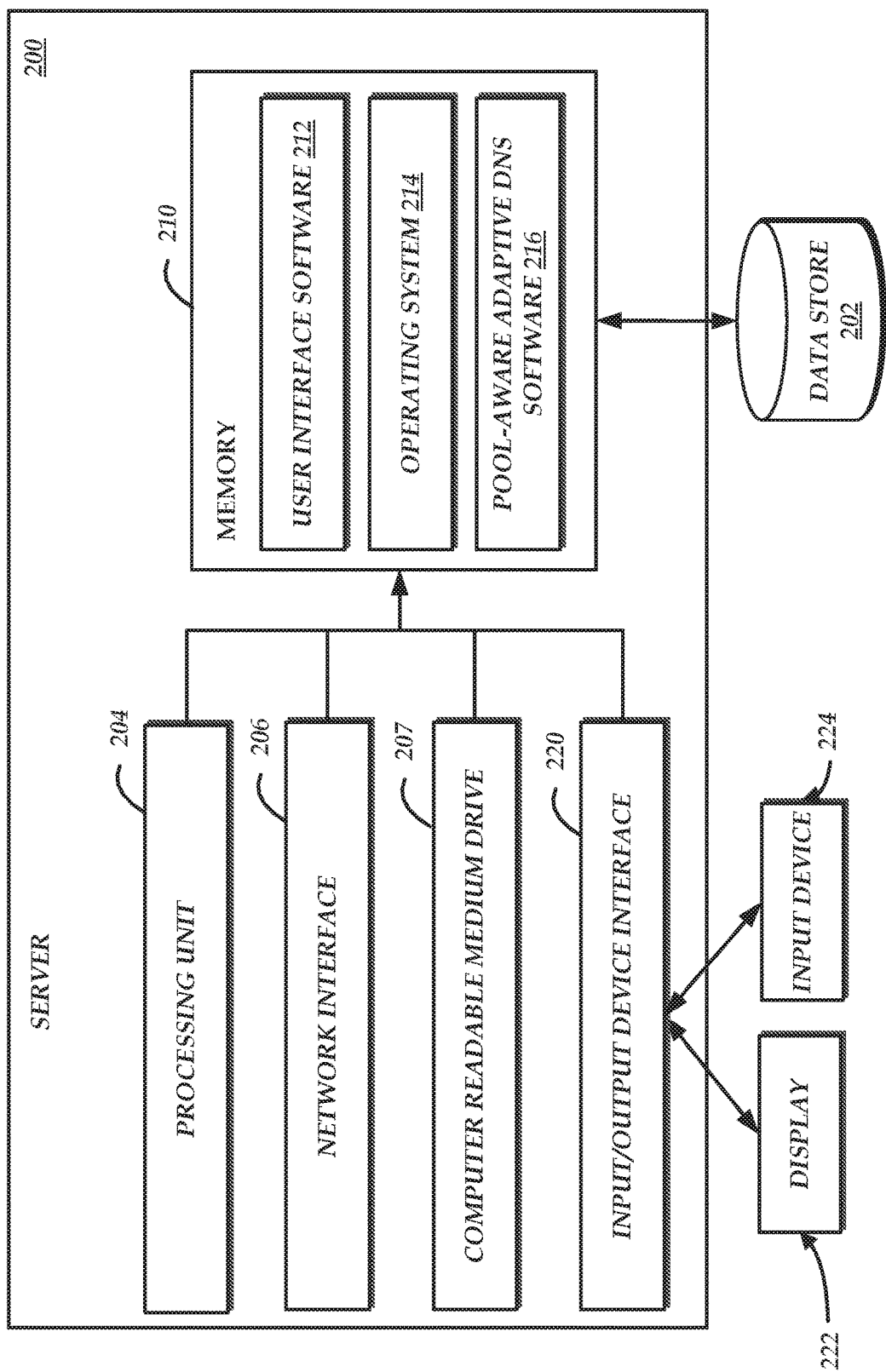
FIG. 2 is a block diagram depicting an illustrative configuration of one embodiment of a server than may provide pool-aware adaptive DNS management.

In some instances, servers 112 providing a service may become unreachable, unreliable, or otherwise unhealthy due to problems at the server 112, on the network 140, etc. In these instances, it is generally undesirable for the DNS resolution system 130 to continue to associate the service with those unreliable or unreachable servers 112. To identify servers 112 that have become unhealthy, the environment includes a health check system 120. As shown in FIG. 2, the health check system 120 can include a health check manager 122, one or more health check servers 124, and a configuration data store 126. Each component of the health check system 120 may correspond to a physical computing device, or may be implemented as a virtual device. Within the health check system 120, the health check servers 124 can function to generate health check data and transmit that health check data to a destination server 112 to verify the health of that server 112 in providing a service. Health check data can include, for example, network packets formatted to elicit an expected response from a health check target, such as Internet Control Message Protocol [ICMP] echo packets, hypertext transport protocol [HTTP] request packets, etc. In the instance that the servers 112 function to host a web site, health check data may include HTTP request packets expected to result in a response with an appropriate HTTP status (e.g., HTTP 200 status).

The information utilized by the health check system 120 can be stored within a configuration data store 126. For example, the health check data store 120 may include information specifying address information for a server 122 (e.g., via universal resource indicator [URI], internet protocol [IP] address, etc.), as well as information specifying what type of health check data should be transmitted to the server, criteria for distinguishing valid or invalid responses, and criteria for determining whether a server 112 has failed based on whether responses are valid or invalid. The configuration data store 126 may correspond to any persistent or substantially persistent data storage, such as a hard drive (HDD), a solid state drive (SDD), network attached storage (NAS), a tape drive, or any combination thereof. The configuration data store 126 may be implemented directly by a physical storage device, or may be implemented by a virtualized storage device that is in turn implemented on an underlying physical storage device.

Within the health check system 120, the health check manager 122 may function to control operation of the health check servers 124 (e.g., by instructing the health check servers 124 to conduct health checks with respect to specific servers 112), and to process data obtained in response to those health checks in order to detect unhealthy servers. For example, the health check manager 122 may function to aggregate responses obtained at various health check servers 124 from a given server 112, and to determine whether such responses indicate that the server 112 has become unhealthy. In one embodiment, the health check manager 112 may determine that a server 112 has become unhealthy when a threshold number or percentage of health checks result in an invalid response (or lack of response) within a specified period of time.

In the instance that the health check system 120 determines that a server 112 is unhealthy, the health check manager 122 may notify the DNS manager 132 of this determination. The DNS manager 132, in turn, modify operation of the DNS resolvers 134 to halt inclusion of a network address of the unhealthy server in DNS records returned by the DNS resolution system 130. In one embodiment, halting inclusion of the network address of an unhealthy server may include removing that network address from a DNS record including network addresses of other servers 112 within the pool 114. In another embodiment, halting inclusion of the network address of an unhealthy server may include removing that network address as a candidate address for load balancing or distribution purposes (e.g., removing the address from a round robin queue, a random address selection algorithm, etc.). In this manner, the DNS resolution system 130 can avoid causing client devices 102 to attempt to access a service via an unhealthy server 112.

As is apparent from the above description, the changes in operation of the hosting system 110, such as scaling down or scaling up a pool 114, can effect operation of the DNS resolution system 130. Similarly, changes in operation of the DNS resolution system 130, such as removal of a network address for an unhealthy server 112, can effect operation of the hosting system 110 (e.g., by causing traffic to be routed away from unhealthy servers 112). However, traditional hosting systems and DNS are typically not integrated, or rely on loose and potentially faulty integration (such as advertising protocols implemented by the servers 112 themselves). Aspects of the present application improve the integration of hosting systems 110 and DNS resolution systems 130, by enabling changes to a pool 114 of servers 112 at a hosting system 110 to be communicated to a DNS resolution system 130, resulting in automatic modification of DNS records corresponding to the pool 114 (e.g., without reliance on operation of the servers 112 themselves). Moreover, aspects of the present application enable health checking information generated externally to a hosting system 110, such as by a DNS resolution system 130, to be utilized to control operation of the hosting system 110.

Specifically, as will be described in more detail below, protocols are disclosed herein that can enable a server manager 116 and DNS manager 132 to communicate regarding scale ups and scale downs in a pool 114, and to automatically modify DNS records for a service provided by the pool in accordance with those scale ups and scale downs. Moreover, implementation of scale downs can be managed in conjunction with the DNS manager 132, to ensure that connections to the scaled-down server 112 are properly "drained" before that server 112 is decommissioned from the hosting system 110. For example, the DNS manager 132 may interact with the hosting system 110 to delay decommissioning of a server 112 until it determines that there are no live DNS records including a network address of the server 112. Thereafter, the server 112 can be decommissioned, and the pool 114 scaled down, without resulting in errors at client devices 102 that may otherwise attempt to access the server 112.

Further, protocols are disclosed herein, and described in more detail below, that enable health checking data generated at the health check system 120 to be communicated to the hosting system 110, to assist the hosting system 110 in managing operation of the servers 112. The hosting system 110 can further communicate modifications to the servers 112 made based on the health check data to the DNS resolution system 130 or the health check system 120, to control operation of those systems. For example, where the hosting system 110 determines that a server 112 should be decommissioned based on health check data (e.g., indicating that the server 112 is unhealthy), the hosting system 110 may communicate that data to the health check system 120, thus enabling the health check system 120 to cease health checking the server 112.

FIG. 2 depicts one embodiment of an architecture of a server 200 that may implement a DNS manager 132 or other components described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 222, and an input device 224, all of which may communicate with one another by way of a communication bus. The network interface 206 may provide connectivity to one or more networks or computing systems, such as the network 140 of FIG. 3. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 202, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include pool-aware adaptive software 216 that may be executed by the processing unit 204. In one embodiment, the health check endpoint software 216 implements various aspects of the present disclosure, e.g., monitoring a state of a pool of servers implementing a service, and modifying operation of a DNS resolution service based on that state.

Figure 3:
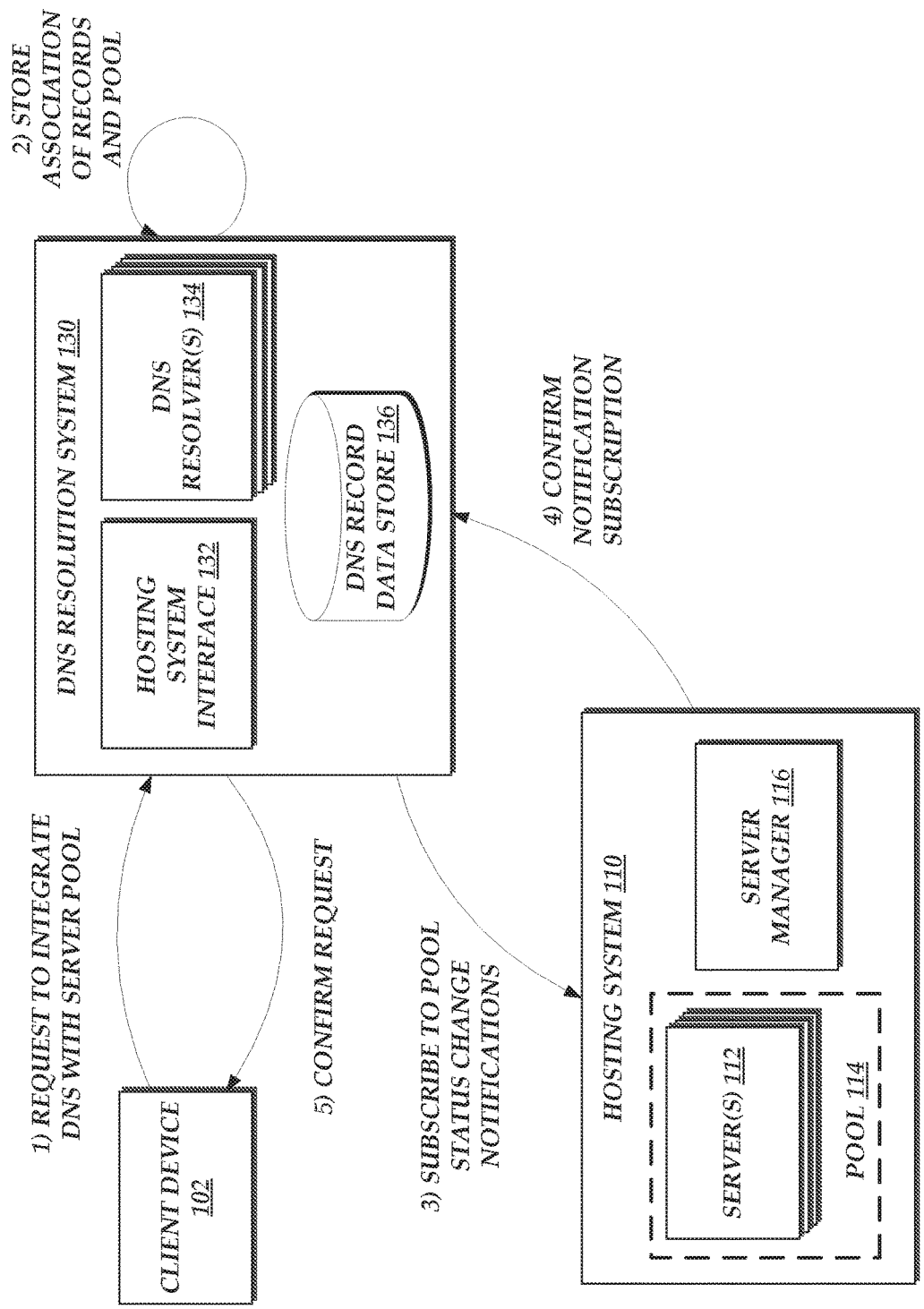
FIG. 3 is a block diagram depicting illustrative interactions to service requests for implementation of pool-aware adaptive DNS management for a network-accessible service.

With reference to FIG. 3, a set of illustrative interactions for associating a DNS resolution system 130 to a hosting system 110 to integrate operations of those systems will be described. The interactions may be initiated, for example, by a client device 102 operated by a user for whose benefit the pool 114 of servers 112 is implementing a service. Specifically, at (1), the client device 102 submits a request to the DNS resolution system 130 to integrate operation of the DNS resolution system 130 with operation of the pool 114. The request may be submitted, for example, via a command line interface (CLI) or graphical user interface (GUI), such as a web interface, providing by the DNS resolution system 130 (or another system, not show in FIG. 3, providing interfaces for the DNS resolution system 130). The request may include, for example, information specifying one or more DNS records maintained by the DNS resolution system 130 on behalf of the client device 102 (e.g., DNS records of a given domain name), as well as an identifier of a pool 114 of servers associated with those DNS records. The identifier of the pool 114 may be, for example, an identifier assigned by the hosting system 110 to logically associate the servers 112 providing the service.

At (2), the DNS resolution system 130 processes the request, and stores an association of the DNS records identified in the request and the pool 114 identified in the request. This association can be utilized as described below to modify operation of the DNS resolution system 130 based on changes within the pool 114, and to communicate changes in operation of the DNS resolution system 130 to potentially modify operation of the pool 114. Illustratively, when the DNS resolution system 130 determines that a change has occurred in the pool 114, the DNS resolution system 130 may automatically modify the DNS records identified in the request based on those changes to the pool 114.

To monitor changes to the pool 114, the DNS resolution system 130 can request that the hosting system 110 notify the DNS resolution system 130 as changes are made to the pool 114. Accordingly, at (3), the DNS resolution system 130 transmits a request the hosting system to subscribe to status change notifications for the pool 114. These status change notifications may include, for example, notifications when the server manager 116 intends to add or remove servers 112 from the pool 114. In some instances, the hosting system 110 may be independently configured to post status change notifications to a notification service, such as a Rich Site Summary (RSS) feed. In such instances, the DNS resolution system 130 may subscribe to that notification service. At (4), the hosting system 110 confirms to the DNS resolution system 130 that notifications for status changes to the pool 114 will be sent to the DNS resolution system 130.

Figure 4:
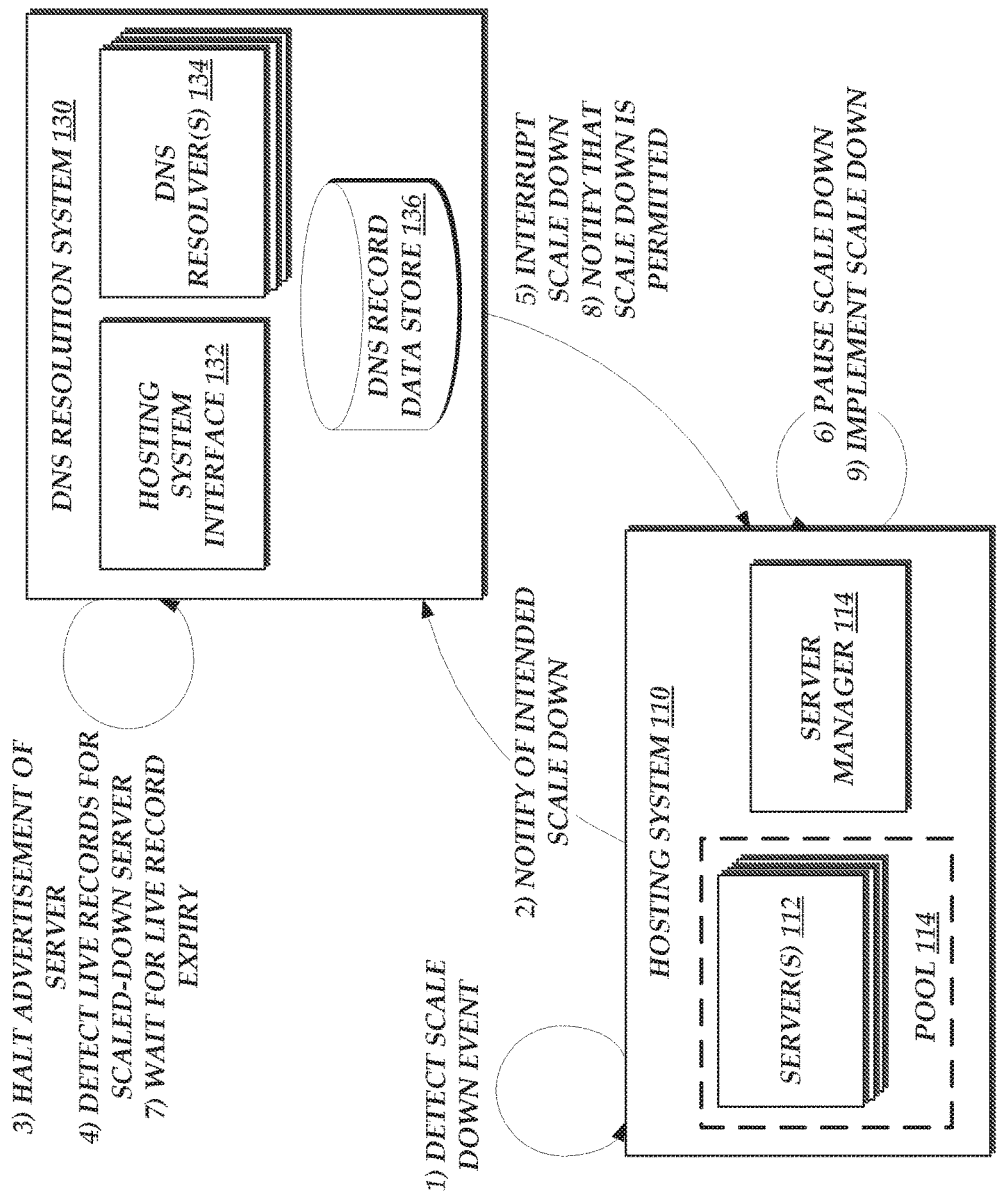
FIG. 4 is a block diagram depicting illustrative interactions to modify DNS records for a network-accessible service based on scaling of a pool of servers implementing the network-accessible service.

With reference to FIG. 4, illustrative interactions will be described for utilizing status change notifications to modify behavior of the DNS resolution system 130 while reducing the chances of errors caused by modifying a pool 114 hosting a service. Specifically, interactions will be described for scaling down the pool 114, by removing a server 112 from the pool 114, while implementing DNS-based connection draining for the server 112. Accordingly, the interactions of FIG. 4 can be utilized to scale down a pool 114 without resulting in errors as client devices 102 attempt to access the server 112 removed from the pool 114.

The interactions of FIG. 4 begin at (1), where the hosting system 110 detects a scale down event, which may correspond to satisfaction of criteria for removing at least one server 112 from the pool 114 providing a hosted service. Illustratively, the scale down event may correspond to an average computing resource usage of the servers 112 dropping below a threshold level for a specified period of time. In response to a scale down event, the hosting system 110 may be configured to attempt to remove a server 112 from the pool 114 in order to more efficiently use the computing resources of the hosting system 110.

However, immediately removal of a server 112 from the pool may lead to errors, as client devices 102 continue to attempt to access the server 112. Because these client devices 102 can generally discover a network address of the server 112 based on DNS records, the hosting system, at (2), can notify the DNS resolution system 130 of the intended scale-down, in order to allow the DNS resolution system 130 to properly drain connections from the server 112 to be removed from the pool 130. The notification may include, for example, a network address of the server 112 to be removed, or other identifying information of the server 112, as well as identifying information of the pool 114.

After receiving a notification of an intended scale down, at (3), the DNS resolution system 130 halts advertisement of the server 112 to be removed from the pool 114 within DNS records. Illustratively, the DNS resolution system 130 may remove a network address of the server 112 from DNS records corresponding to the service provided by the pool 114 (e.g., by modifying DNS records that would otherwise include the network address to not include the network address, by removing the network address as a candidate address for load balancing or load distribution selection schemes, etc.), to ensure that client devices 102 receiving future DNS records do not attempt to access the service at the to-be-removed server 112. In addition, at (4), the DNS resolution system 130 determines whether any live DNS records exist for the to-be-removed server 112. Specifically, the DNS resolution system 130 can determine DNS records corresponding to the pool 114 to be scaled-down, based on an association between those DNS records and the pool 114 (e.g., as created during the interactions of FIG. 3). In one embodiment, the DNS resolution system 130 can then determine the last time at which a relevant DNS record was sent from the DNS resolution system 130 including a network address of the server 112 within the pool 114, and increment that time by the TTL value of the DNS record. If that incremented time has not yet passed, the DNS resolution system 130 can detect that live records exist for the server 112 to be removed from the pool 114. In another embodiment, the DNS resolution system 130 may simply assume that live records exist for the server 112, and thus increment a current time with the TTL value to determine a period in which live records are assumed to exist, which may reduce the need for the DNS resolution system 130 to maintain a log of when a last relevant DNS record was transmitted. In some instances, the DNS resolvers 134 may be located in geographically diverse locations, or the DNS resolution system 130 may provide DNS records to other DNS components (not shown in FIG. 4), and thus, a propagation delay may exist for DNS records to propagate to other components. In such instances, the DNS resolution system 130 may further increment a relevant time (e.g., a time at which the last relevant DNS record was sent or a current time) with the expected propagation delay.

In the example of FIG. 4, it will be assumed that live records for the pool 114, including network address information of the server 112 to be removed from the pool 114, exist. Thus, at (5), the DNS resolution system 130 transmits an interrupt message to the hosting system 110, causing the hosting system 110 to pause scale down of the pool 114, at (6). The DNS resolution system 130, at (7), then waits until a time at which no live DNS records exist indicating that the server 112 as a point of access for the service provided by the pool 114. Thereafter, at (8), the DNS resolution system 130 notifies the hosting system 110 that scale down is permitted (e.g., that removal of the server 112 is not expected to result in client errors, as the server 112 is not expected to be indicated in any live DNS records for a corresponding service). At (9), the hosting system 110 can then remove the server 112 from the pool 114 (e.g., by shutting down the server 112 or repurposing the server 112 to host a different service). Thus, a scale down of the pool 114 can be achieved without resulting in client errors due to inaccurate DNS records.

While illustrative interactions are described above with respect to FIG. 4, various alterations are contemplated and within the scope of the present disclosure. For example, while an interrupt message is described above as a mechanism to interrupt scale down of the pool 114, some embodiments of the present disclosure may utilize a permission-based scaled down, whereby a hosting system 110 requests permission from the DNS resolution system 130 to scale down a pool 114 (which may be granted or denied, for example, based on whether live DNS records are expected to exist relevant to the scale down). In such permission-based systems, interrupt messages may not be required, and these interactions may be omitted. Furthermore, while the interactions of FIG. 4 describe the DNS resolution system 130 as implementing a waiting period, and providing an indication to the hosting system 110 when the scale down is permitted, this waiting period may additionally or alternatively be implemented at the hosting system 130. For example, the DNS resolution system 130 may transmit to the hosting system 130 the time after which no relevant live DNS records are expected to exist, and the hosting system 110 may wait until after this time to scale down the pool 114. Various other modifications will be apparent to one skilled in the art based on the present disclosure.

The illustrative interactions described in FIG. 4 relate generally to scaling down of a pool 114. However, similar interactions may be utilized to address scaling up of a pool 114. In general, because scale ups are unlikely to result in client errors due to inaccurate DNS records (e.g., because any network addresses in prior DNS records would still point to a valid server 112 within the pool 114), it may be unnecessary to "drain connections" from a server 112 before making modifications to the pool 114. Accordingly, after a hosting system 110 determines that a scale up is needed (e.g., due to computing resource usage of the pool 114 exceeding a threshold value), the hosting system 110 can notify the DNS resolution system 130 of the scale up. The DNS resolution system 130 can thereafter determine DNS records associated with the scaled-up pool 114, such as by reference to an association created via the interactions of FIG. 3, and modify those DNS records to reflect the presence of a new server 112 within the pool 114. Thus, client devices 102 accessing the DNS records can be enabled to access a service of the pool 114 at the new server 112.

While the interactions of FIG. 4 generally relate to scaling down of a pool 114, similar interactions may be utilized to gracefully handle other situations that may occur on the pool 114, to allow client computing devices 102 to continue to interact with the pool 114 without error. For example, when maintenance is planned for a server 112 within the pool 114, the server 122 may become unavailable for a period of time.

It may therefore be advantageous to "drain" the server 112 of active connections with client computing device 102. Accordingly, the interactions of FIG. 4 may be modified such that interaction (1) corresponds to detecting that a server 112 will be unavailable in the future. The further interactions of FIG. 4 may then be utilized to ensure that no live DNS records include the network information of the server 112, after which the hosting system 110 can proceed to conduct maintenance actions on the server 112 (or to allow such actions to be conducted) while reducing or eliminating errors that may occur due to attempts to access the server 112 during maintenance. When the hosting system 110 detects that the server 112 has once again become available, the hosting system 110 may notify the DNS resolution system 130 that it may resume transmission of DNS records including network information of the server 112.

Figure 5:
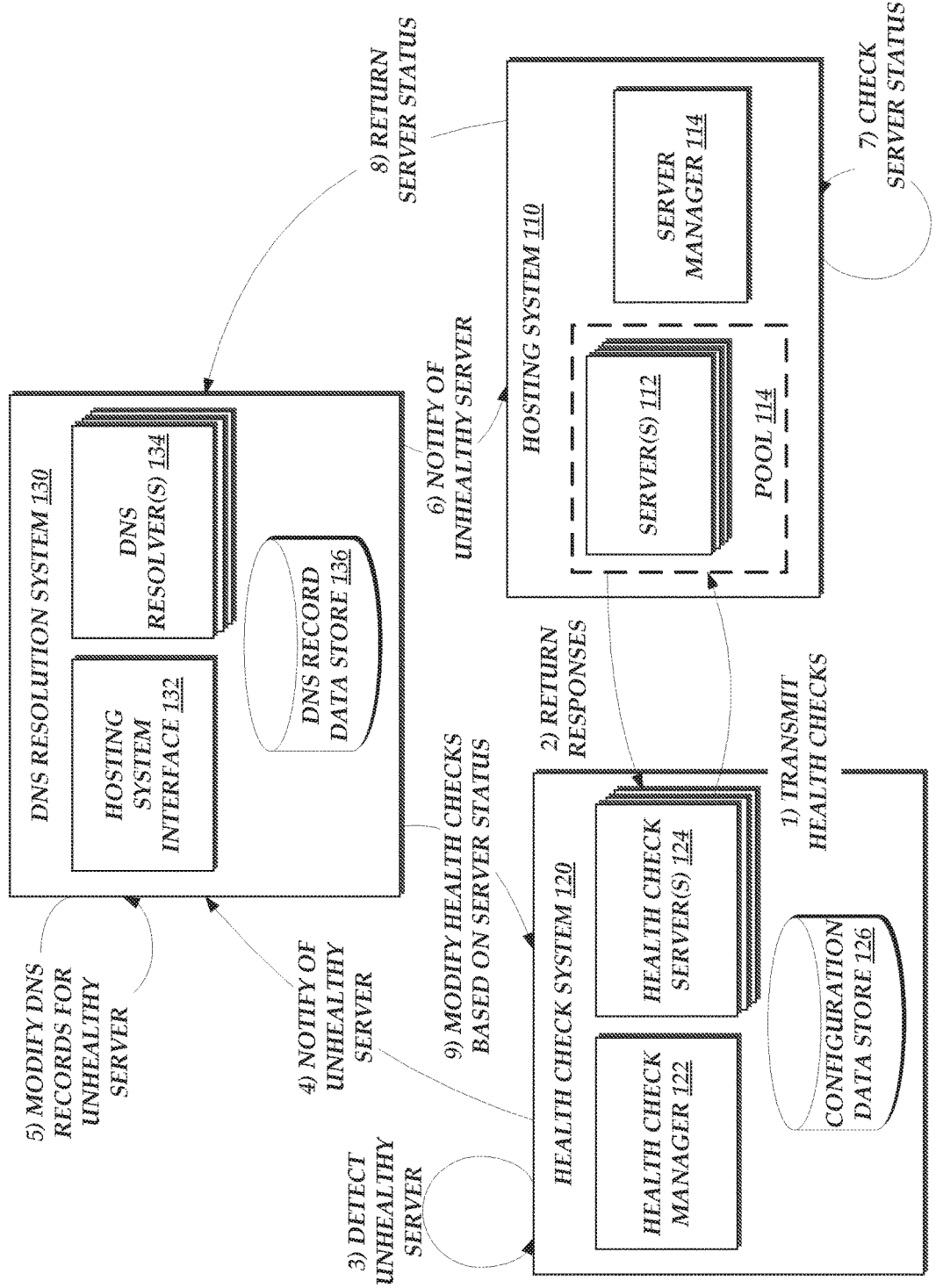
FIG. 5 is a block diagram depicting illustrative interactions to utilize health checks for a pool of servers implementing a network-accessible server to manage DNS record for the service.

With reference to FIG. 5, illustrative interactions are shown to enable information gathered during operation of the DNS resolution system 130 to be communicated to the hosting system 110 to potentially modify operation of a pool 114 hosting a service, and to enable the DNS resolution system 130 to handle such modifications. Specifically, the interactions of FIG. 5 relate to interactions for removing a server 112 from DNS records in response to a failed health check, and communicating with a hosting system 110 regarding that failed health check to take mitigating action with respect to the server 112 and control further operation of the health check system 120.

The interactions of FIG. 5 begin at (1), where one or more health check servers 124 of the health check system 120 transmit health check data to a destination server 112 within the pool 114. Illustratively, the health check data may include any network-transmission formatted to elicit an expected response from the server 112, in order to verify that the server 112 is providing proper access to a service. The health check data may, for example, mimic a typical request sent to the service by a client device 102 (e.g., as an HTTP request similar to those which may be generated by client devices 102). At (2), the servers 112 can transmit a response, which can be utilized by the health check system 120 to determine whether the server 112 is "healthy" (e.g., whether the server is providing appropriate responses indicating it is implementing the service). While a response is shown in FIG. 5, unhealthy servers 112 may in some instances return no response.

At (3), the health check system 120 utilizes the returned responses (if any) to determine whether the server is unhealthy. Illustratively, the health check system 120 may be configured to require that at least a threshold percentage of responses returned by the servers 112 differ from an expected response in order to classify the server 112 as unhealthy. In the example of FIG. 5, it will be assumed that health check system 120 determines that the server 112 to which health check data was transmitted is unhealthy. Accordingly, at (4), the health check system 120 notifies the DNS resolution system 130 that the server 112 is unhealthy.

Because unhealthy servers 112 fail in at least some cases to provide expected responses to client requests, the DNS resolution system 130 can be configured to halt inclusion of a network address of an unhealthy server within DNS responses. Accordingly, at (5), the DNS resolution system 130 modifies DNS records associated with the unhealthy server 112.

In some instances, an unhealthy status is temporary, such that the server 112 will later resume expected responses to requests, and once again become healthy. For example, a server 112 may become unhealthy due to routine maintenance at the hosting system 110, or due to temporary network conditions between the hosting system 110 and the health check system 120. Thus, the default action for the health check system 120 may be to continue to periodically transmit health check data to the unhealthy server 112, to detect if that server 112 becomes healthy.

While continuing transmission of health check data to unhealthy servers 112 can be useful to detect if those servers 112 once again become healthy, it can also increase network congestion and computing resource usage of the health check system 120 and the hosting system 110. This effect is particularly detrimental when the server 112 does not become healthy in the future.

To address this scenario, the DNS resolution system 130 can, in addition to removing an unhealthy server 112 from relevant DNS records, communicate with the hosting system 110 to verify the status of the server 112, as shown at (6). The communication between the DNS resolution system 130 and the hosting system 110 may include, for example, a notification that a specified server (e.g., as specified by network address, domain name, or other identifiers) has failed health checks. At (7), the hosting system 110 can check the status of the server 112, to determine what action to take in response to that notification. In one instance, such as in instances where the unhealthy status is expected due to maintenance of the server 112, the hosting system 110 may, at (8), notify the DNS resolution system 130 that the server 112 will be maintained within the pool 114, and thus, that health checking should continue for the server 112. In another instance, such as instances where the unhealthy status is unexpected, the hosting system 110 may remove the server 112 from the pool 114. In these instances, the hosting system 110 may, at (8), notify the DNS resolution system 130 that the server 112 will be removed from the pool 114. In either instance, the server status may be additionally communicated to the health check system 130, at (9), to control how future health checks are transmitted. Illustratively, where the server 112 is to be maintained within the pool 114, health checks for the server 112 may continue. Where the server 112 is to be removed from the pool 114, the health check system 120 may cease to transmit health checks to the server 112. Thus, by the interactions described above, the health check system 120 can determine the status of a server 112 determined to be unhealthy, to control how future health check data is transmitted to the server 112.

While illustrative interactions are described above with respect to FIG. 5, various alterations are contemplated and within the scope of the present disclosure. For example, while the DNS resolution system 130 is described as communicating with the hosting system 110 to verify whether an unhealthy server 112 will be maintained or removed from a pool 114, these interactions may additionally or alternatively occur directly between the health check system 120 and the hosting system 110. Illustratively, when an unhealthy server 112 is detected, the health check system 120 may communicate identifying information of the server 112 to both the DNS resolution system 130 and the hosting system 110, and may process responses from the hosting system 110 in order to control further transmission of health check data to the server 112. As a further example of alterations to the interactions of FIG. 5, while the hosting system 110 is described as returning a status of a server 112 in response to a notification that the server 112 has become unhealthy, the hosting system 110 may in some instances notify the DNS resolution system 130 (or the health check system 120) only when a server is to be removed from the pool 114, in order to allow the health check system 120 to cease transmitting health check data to the server 112. The health check system 120 may otherwise continue to transmit health check data to the server 112, to determine whether the server 112 once again becomes healthy.

As an additional potential alteration to the illustrative interactions of FIG. 5, some embodiments of the present disclosure may allow for use of non-binary health determinations for servers 112. For example, while the interactions described above can be used to determine that a server 112 is either healthy or unhealthy, embodiments of the present disclosure may also enable the health check system 120 to designate a server as an intermediate health state, such as "approaching unhealthy" or "heavily loaded." Illustratively, an administrator of the health check system 120 or the hosting system 110 may designate health check response thresholds based on which a server 112 could be designated as in one or more states of health. These thresholds may be based on a response provided by the server 112, or metadata regarding the response. For example, rather than verifying that a health check results in an expected response, the health check servers 124 may determine whether a response includes a value falling within the threshold range for "healthy," "unhealthy," or an intermediate health state. The health check data may then be formatted to elicit a response including the desired value (e.g., as a query regarding the number of requests handled by the targeted server 112 in a specified period of time). As another example, the health check servers 124 may determine whether metadata for a response indicates a value falling within the threshold range for "healthy," "unhealthy," or an intermediate health state. This metadata may include, for example, a latency of the response or other network-health metrics. Each potential health state may be associated with a designated set of actions on the health check system 120 or the DNS resolution system 130. For example, determination that a server 112 is unhealthy may proceed as described above with respect to FIG. 5. Determination that a server 112 is in an intermediate state of health (e.g., "approaching unhealthiness") may result, for example, in the DNS resolution system 130 modifying a load balancing or distribution mechanism to partially redirect traffic from the server 112 (e.g., by lowering a weighting of the server 112 in a random load balancing algorithm). Determination that a server 112 is in an intermediate state of health (e.g., "approaching unhealthiness") may also result in a notification to the hosting system 110 regarding the determined health state, regardless of whether operation of the DNS resolution system 130 is modified.

In some instances, the communications between the hosting system 110 and the DNS resolution system 130 or the health check system 120 may operate on a "pull" rather than "push" basis. For example, rather than the DNS resolution system 130 or the health check system 120 notifying the hosting system 110 of an unhealthy server 112 (or server in an intermediate health state), the hosting system 110 may query or poll the DNS resolution system 130 or the health check system 120, and receive a response regarding a last-known state of servers 112 (or particular servers 112) within a pool. Various other modifications will be apparent to one skilled in the art based on the present disclosure.

Figure 6:
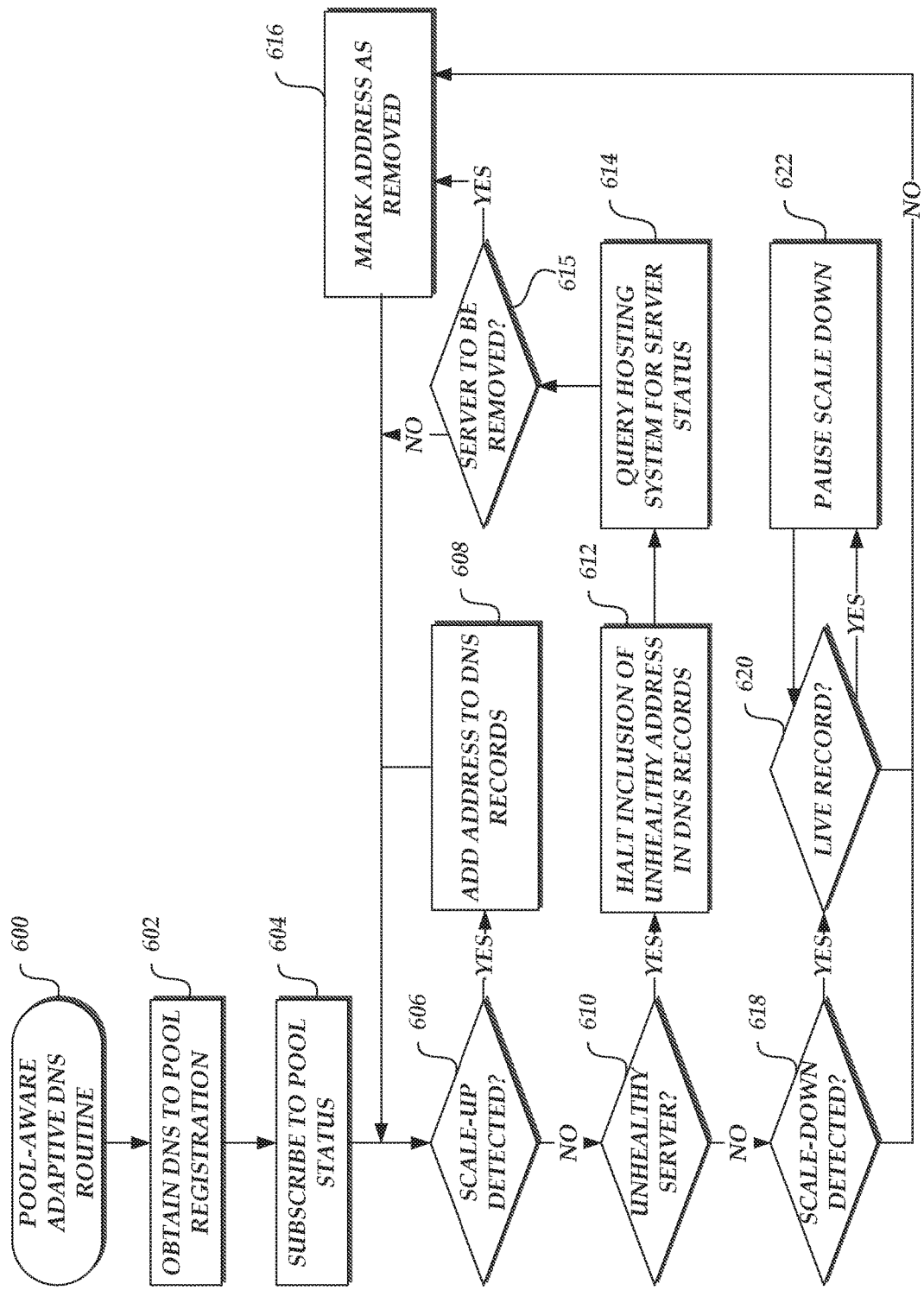
FIG. 6 is a flow chart depicting an illustrative routine for implementing pool-aware adaptive DNS management.

With reference to FIG. 6, one illustrative routine 600 that may be implemented to implement a DNS resolution system based on a status of a corresponding pool of servers will be described. The routine 600 may be implemented, for example, by the DNS manager 132 of FIG. 1.

The routine 600 begins at block 602, where the DNS manager 132 obtains a request to register pool (e.g., a pool 114 of servers 112, as shown in FIG. 1) as associated with one or more DNS records (e.g., records for a specified domain name or service). Illustratively, the request may identify the relevant DNS records, as well as an identifier for the pool implementing a service associated with those DNS records.

At block 604, the DNS manager 132 subscribes to a status of the pool, in order to obtain notifications regarding changes to the configuration of the pool, such as scaling of the pool to control usage of computing resources. Illustratively, the DNS manager 132 may subscribe to the status of the pool by requesting that a manager of the pool (e.g., pool manager 116) notify the DNS manager 132 of any changes to configuration of the pool, or by subscribing to another information resource (e.g., an RSS feed) including information regarding configuration of the pool, or changes thereto.

At block 606, the routine 600 varies according to whether the DNS manager 132 detects that a scale up has occurred on the pool. If so, the routine 600 continues to block 608, where DNS records associated with the pool are updated to add reference to the server added to the pool during the scale up (e.g., by adding an IP address of the server to a DNS record associated with the service provided by the pool). The routine 600 then returns to block 606.

If no scale up is detected at block 606, the routine 600 continues at block 610, wherein the routine 600 varies according to whether a server of the pool has been detected to be unhealthy (e.g., by a health checking system, such as health check system 120 of FIG. 1). If so, the routine 600 proceeds to block 612, where the DNS manager 132 halts inclusion of network information of the unhealthy server within DNS records associated with the service provided by the pool, such that client devices 102 will not be directed to the unhealthy server by the DNS records. Halting inclusion of network information of an unhealthy server may include, for example, modifying a load balancing or distribution algorithm such that DNS records including the network information are not selected for distribution, or may include modification of DNS records to remove the network information from such records. The routine 600 further proceeds to block 614, where the DNS manager 132 queries a hosting system associated with the unhealthy server to determine whether the server is to be removed from the pool. At block 615, implementation of the routine 600 varies according to whether a notification is received that the unhealthy server is to be removed. If so, the routine 600 proceeds to block 616, where the network address of the unhealthy server is marked by the DNS manager 132 as removed. Illustratively, marking the address as removed may result in the DNS manager 132 halting transmission of health check data to the unhealthy server, or instructing another component, such as a health check system, to halt transmission of health check data. After implementation of block 616, or if no notification is received at block 615 that the unhealthy server is to be removed from the pool, the routine 600 returns to block 606, as described above.

Returning to block 610 of the routine 600, if no unhealthy server is detected, the routine 600 proceeds to block 618, where implementation of the routine 600 varies according to whether a scale down is detected. As discussed above, a scale down can generally include receiving information indicating that a server is to be removed from a pool of servers providing a service. If a scale down is detected, the routine 600 proceeds to block 620, where the DNS manager 132 determines whether any live DNS records including the server to be removed from the pool exist. In one embodiment, live records may be identified by TTL values included within those records. For example, the DNS manager 132 may determine the last time that a record including a network address of the to-be-removed server was transmitted, and increment that time by the TTL value of the record to determine an estimated time at which no live records including the network address of the to-be-removed server will exist. As another example, rather than attempt to determine the last time a relevant record was transmitted, the DNS manager 132 may instead increment a current time with a standard TTL value used in the relevant records to determine an estimated time at which no live records including the network address of the to-be-removed server will exist. In either instance, the DNS manager 132 may further adjust the estimated time based on a propagation time of those records accords a network (e.g., to other DNS servers).

If live records including a network address of a to-be-removed server exist, the routine 600 proceeds to block 622 and pauses until a time at which no live records including the server to-be-removed are predicted, forecasted, or anticipated to exist (e.g., a reference time, such as the current time or a last transmission time of a relevant record, incremented by a TTL value and potentially by a propagation time). Thereafter, the routine 600 returns to block 620.

If no live records including a network address of a to-be-removed server are predicted to exist, the routine 600 proceeds to block 616, as described above. The routine 600 may then continue as an "infinite loop," while pool-aware adaptive DNS is desired for the pool.

In some embodiments of the present disclosure, various functionalities described with respect to the routine 600 may be implemented in parallel, or as separate routines. For example, block 602 and 604 may be implemented as a first routine (e.g., in connection with a client request to associate a pool with DNS records), blocks 606 and 608 may be implemented as a second routine (e.g., running continuously to receive and process notifications regarding scale ups of a pool), blocks 610 through 616 may be implemented as a third routine (e.g., running continuously to receive and process notifications regarding unhealthy servers of a pool), and blocks 618-622, along with an already implemented or separately implemented block 618, may be implemented as a fourth routine (e.g., running continuously to receive and process notifications regarding scale ups of a pool). Division of the routine 600 into multiple parallel routines may advantageously increase the speed of various functionalities of the routine 600, for example, where the DNS manager 132 utilizes parallel processing techniques.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing health checking of a pool of servers based on domain name system (DNS) records associated with the pool of servers, the system comprising:
   a hosting system comprising a processor configured with computer executable instructions to manage the pool of servers, wherein the pool of servers includes a plurality of servers collectively configured to implement a network-accessible service;
   a DNS resolver system comprising a processor configured with computer executable instructions to:
      receive client requests to resolve an identifier of the network-accessible service into a set of network addresses; and
      respond to the client requests by providing the DNS records, wherein the DNS records identify network addresses for at least some of the plurality of servers within the pool; and
   a health checking system comprising a processor configured with computer executable instructions to:
      generate health check data formatted to elicit an expected response from a first server of the pool of servers;
      transmit the health check data to the first server;
      obtain a response to the health check data;
      determine that the response does not match the expected response; and
      transmit a notification to the DNS resolver that the first server appears to be unhealthy;

wherein the DNS resolver is further configured with computer executable instructions to:
  in response to the notification that the first server appears to be unhealthy, halt inclusion of a network address of the first server in the DNS records;
  notify the hosting system that the first server appears to be unhealthy;
  obtain a notification that the hosting system intends to remove the first server from the pool of servers; and
  instruct the health checking system to halt further transmission of health check data to the first server.

2. The system of claim 1, wherein the response to the health check data is at least one of a response other than the expected response or a notification that no response has been received from the first server.

3. The system of claim 1, wherein the plurality of servers are virtual computing devices generated by the hosting system.

4. The system of claim 1, wherein the health checking system is further configured with computer executable instructions to periodically transmit the health check data to the first server until instructed to halt further transmission of the health check data to the first server.

5. The system of claim 1, wherein the DNS resolver is configured to halt inclusion of the network address of the first server in the DNS records at least partly by generating an updated DNS record for the network-accessible service, the updated DNS record excluding a network address of the first server.

6. The system of claim 1, wherein the DNS resolver is further configured to:
  receive a notification that the hosting system intends to add a second server to the pool of servers; and
  modify the DNS records to include a network address of the second server.

7. A computer-implemented method comprising:
  generating health check data formatted to elicit an expected response from a first server selected from a pool of servers providing a network-accessible service;
  periodically transmitting the health check data to the first server until obtaining, from the hosting system, information indicating that the first server will be removed from the pool of servers;
  determining, based on a result of transmitting the health check data to the first server, that the first server appears to be unhealthy;
  halting inclusion of a network address of the first server within DNS records corresponding to the network-accessible service;
  transmitting, to a hosting system configured to maintain the pool of servers, a notification that the first server appears to be unhealthy;
  obtaining, from the hosting system, the information indicating that the first server will be removed from the pool of servers;
  halting further transmission of the health check data to the first server based at least partly on the information indicating that the first server will be removed from the pool of servers; and
  receiving a notification that the hosting system intends to add a second server to the pool of servers; and
  modifying the DNS records to include a network address of the second server.

8. The computer-implemented method of claim 7, wherein the network address is an internet protocol (IP) address.

9. The computer-implemented method of claim 7 further comprising deleting DNS information associated with the first server.

10. The computer-implemented method of claim 7 further comprising determining, based on the result of transmitting the health check data to the first server, that the first server appears to be unhealthy comprises determining that no response to transmission of the health check data has been received.

11. The computer-implemented method of claim 7, wherein halting inclusion of the network address of the first server within DNS records corresponding to the network-accessible service comprises generating an updated DNS record for the network-accessible service, the updated DNS record excluding a network address of the first server.

12. A system comprising:
  a data store including information associating a server configured to implement a network-accessible service, with a service record identifying the server as an endpoint of the network-accessible service; and
  a computing device, comprising a processor, configured with computer-executable instructions to:
    transmit, to the server, health check data formatted to elicit an expected response from the server, wherein the server is included within a pool of servers implementing the network-accessible service;
    determine, based on a result of transmitting the health check data to the server, that the server appears to be unhealthy;
    modify the service record to exclude identifying information of the server;
    transmit, to a hosting system configured to maintain the server, a notification that the server appears to be unhealthy;
    obtain, from the hosting system, information indicating that the server will be decommissioned;
    halt further transmission of the health check data to the server based at least partly on the information indicating that the server will be decommissioned;
    transmit, to a second server of the pool of servers, second health check data;
    determine, based on a result of transmitting the second health check data to the second server, that the server appears to be in an intermediate health state; and
    transmit, to the hosting system, a notification that the second server appears to be in the intermediate health state.

13. The system of claim 12 wherein the computing device is further configured with computer-executable instructions to:
  receive a notification that the hosting system intends to add a second server to the pool of servers; and
  modify the service record to identify the second server.

14. The system of claim 12, wherein the service record comprises one or more DNS records.

15. The system of claim 14, wherein the one or more DNS records identifies endpoints of the network-accessible service by use of network addresses of the endpoints.

16. The system of claim 12, wherein the computing device is further configured with computer-executable instructions to periodically transmit the health check data to the server until obtaining the information indicating that the server will be decommissioned.

17. The system of claim 12, wherein the computing device is configured to modify the service record to exclude identifying information of the server at least partly generating an updated service record for the network-accessible service, the updated service record excluding identifying information of the server.

18. The system of claim 12, wherein the computing device is further configured to delete service record information associated with the server.

19. The system of claim 12, wherein the notification that the server appears to be unhealthy is transmitted in response to a query transmitted by the hosting system to the computing device.

* * * * *